March 16, 1954     S. W. CHANTLER     2,672,173
SELF-LOCKING FASTENING DEVICE
Filed March 30, 1953                   2 Sheets-Sheet 1

Samuel W. Chantler
INVENTOR.

BY J. Raymond Curtin
his Atty.

March 16, 1954     S. W. CHANTLER     2,672,173
SELF-LOCKING FASTENING DEVICE
Filed March 30, 1953     2 Sheets-Sheet 2

Samuel W. Chantler
INVENTOR.

BY J. Raymond Curtin
his Atty.

Patented Mar. 16, 1954

2,672,173

UNITED STATES PATENT OFFICE 2,672,173

SELF-LOCKING FASTENING DEVICE

Samuel W. Chantler, South Orange, N. J., assignor to Elastic Stop Nut Corporation of America, Union, N. J., a corporation of New Jersey Application March 30, 1953, Serial No. 345,579

7 Claims. (Cl. 151—7)

The present invention relates to screw threaded fastening devices and has particular reference to externally threaded devices such as bolts, screws, studs and the like, which may or may not be headed. Still more particularly the invention relates to such devices in which self-locking action is provided through the inclusion in the device of a locking element of thread impressionable elastic plastic material located to have a thread impressed therein by a companion internal thread so that the latter is elastically gripped by the locking element to hold the threaded parts against relative rotation under the influence of vibration to which they may be subjected in use.

Various forms of devices of the general character above described have heretofore been proposed, but so far as I am aware, all such previously proposed devices have been not entirely satisfactory, either because of lack of sufficient holding power, reduction in strength of the article, high cost or other reasons which have prevented the attainment of practical commercial success. It is therefore the general object of this invention to provide a new and improved device of the character under discussion which will provide adequate holding power; which will not be appreciably impaired as to strength characteristics by the inclusion of the locking element and which may readily be manufactured on a production basis at low cost. For a better understanding of the nature of the above mentioned and other objects, and the manner in which they may be attained, reference may best be had to the ensuing portion of this specification taken in conjunction with the accompanying drawings forming a part hereof, in which:

Figure 2:
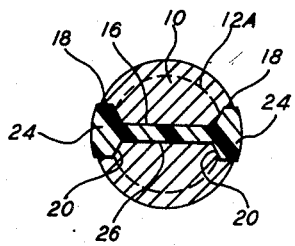
Fig. 2 is a section taken on line 2—2 of Fig. 1.
Figure 1:
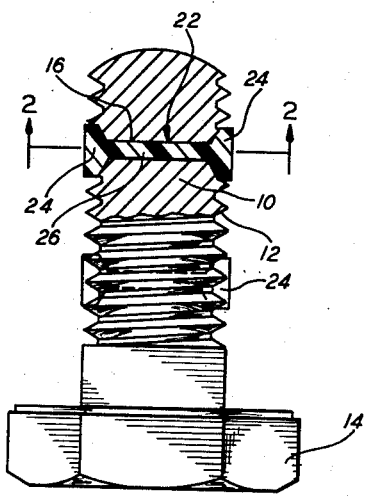
Fig. 1 is a longitudinal view, partly in section and partly in elevation, of an article embodying the invention.

Referring now more particularly to Figs. 1 and 2 of the drawings there is shown an externally threaded device embodying the invention and by way of example but without limitation it has been indicated as a metal bolt of usual form having a shank 10 provided with the external thread 12 and a hexagonal head 14. Insofar as the present invention is concerned the presence or absence of a head, or its form, is immaterial, as is also the particular metal of the bolt.

In the present embodiment the shank 10 is provided with a cavity for receiving material forming a locking element or insert, which cavity comprises a transversely extending diametral bore 16 of relatively small diameter as compared with that of the shank and two counterbores 18 providing sockets at the ends of bore 16, the mouths of the sockets opening through the threaded surface of the shank 10. For reasons hereinafter noted, the counterbores preferably, but not necessarily, extend inwardly, as shown in Fig. 2, so that the inner ends of the cylindrical bores substantially coincide with the minor diameter 12A of the thread 12 in the diametral plane of the cavity normal to the axis of the thread.

A cavity of the kind described is readily and inexpensively formed with standard twist drills by first drilling through the shank with a small diameter drill and then forming the counterbores with drills of larger diameter which leave desirable conical shoulders 20 connecting the counterbores with the small connecting bore.

In order to secure the desired locking action the cavity is filled with an elastic plastic material of thread impressionable nature providing a locking element or insert 22 having enlarged head portions 24 providing locking surfaces at the mouths of the sockets, connected by a ligament portion 26 of smaller diameter.

The exposed locking surfaces, of substantial area, are located radially outside the minor diameter 12A of the thread to have threads impressed therein when the device is assembled in threaded relation with an element having a companion internal thread. The thread impression is operative to plastically displace material of the insert and compress it so that the material is placed under compressive pressure and the desired locking action is obtained due to the elastic pressure engagement between the locking surfaces of the insert and the companion thread. The extent to which the exposed portion of the insert projects beyond the minor diameter of the thread may vary, but with the materials now commonly used for the purpose, a locking surface located in the vicinity of the major diameter of the thread will be found to be satisfactory.

Within the scope of the invention any suitable material may be employed for the insert, but by way of example such materials as the class commonly referred to as artificial thermoplastics and including such moldable substances as cellulose derivatives, various synthetic resins such as vinyl and styrene derivatives, phenols, cresylics, anilines, ureas, melamines, alkyds and fluorocarbons, and linear polyamides such as the polymeric condensation product of a dibasic acid and a diamene known commercially as nylon may be used, nylon being a preferred material.

Figure 3:
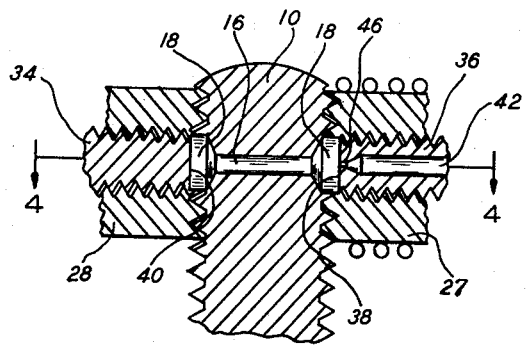
Fig. 3 is a longitudinal central section showing apparatus for forming the locking insert in the article shown in Fig. 1.
Figure 4:
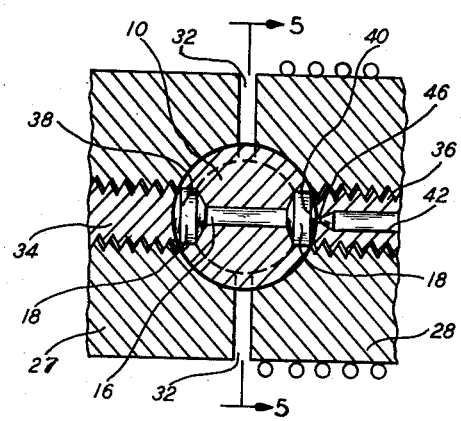
Fig. 4 is a section taken on the line 4—4 of Fig. 3.
Figure 5:
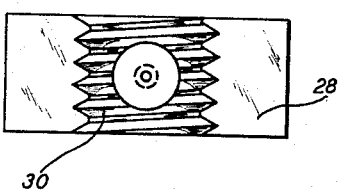
Fig. 5 is an elevation of one of the die blocks shown in Fig. 4, seen from the line 5—5 of Fig. 4.

Devices embodying the invention may have the locking insert formed therein by an injection molding operation, as by means of apparatus of the kind shown in Figs. 3 to 5. Referring to these figures the apparatus comprises separable die blocks 27 and 28 providing between their confronting faces a die cavity having a bore provided with an internal thread 30 and adapted to be clamped against the device into which the insert material is to be injected. Such blocks may readily be made by suitably boring and threading a solid die block and thereafter parting it diametrally of the bore, the material removed by the parting operation providing the highly desirable clearance spaces 32 between the blocks when they are clamped in position, such clearance compensating for variations in thread size of the articles treated and insuring tight contact in all cases between the threads of the blocks and the threads of the article clamped between them, so that the threads of the latter adjacent to the mouths of the sockets are filled.

The blocks 27 and 28 are also bored transversely and preferably threaded to receive the plugs 34 and 36, the inner faces 38 and 40 of which are shaped and positioned to determine the contour and positions of the exposed locking faces of the insert. As previously noted, the locking faces of the insert are positioned radially outwardly at least beyond the minor diameter of the thread, so as to be engaged by a companion thread. They may however extend beyond the pitch diameter to, or even beyond, the major diameter of the thread, the extent of projection beyond the minor diameter to secure the best results depending upon the specific physical properties of the locking material used, and being determined by the positioning of the inner faces 38 and 40 of the plugs in the die blocks. As will be observed from the several cross sectional figures such as Figs. 2, 4, 7 and 8, the locking faces are advantageously made convex, particularly with reference to a plane normal to the axis of the thread intended to engage the insert and impress a thread therein. With a convex surface, particularly in the plane mentioned, it will be apparent that the cooperating thread, upon engaging the surface, will ride over the surface and impress a thread in the yielding elastic material rather than broach a shaving from the surface, an undesirable action which might otherwise tend to occur. In the specific embodiments illustrated, as will be seen from Figs. 1 and 2 and from Figs. 6 and 7, the convex surfaces are cylindrically curved, this being a preferred configuration, but other specific configurations may be utilized.

Also, as will be observed from the figures, the cavities are advantageously formed so that the locking surfaces of the heads of the inserts are located axially of the shank in like relation to a transverse plane normal to the axis of the shank, the heads of the insert intersecting the same set of convolutions of the thread. The arrangement shown, in which the heads of the insert are located in like positions axially of the shank, is preferred. This precise positioning is not required, but for best results insofar as effective locking action is concerned, the heads should not be axially offset with respect to each other to such an extent that there is no axial overlap. In other words, for best results, at least one and preferably more, thread convolutions should be intersected by the locking surface provided by both heads of the insert.

While for ease of manufacture and adjustment of the depths of the recesses in the die blocks, threaded plugs are advantageous, it is apparent that other means may be employed, such as plugs having driving fits in the die blocks, or by forming suitable recesses directly in the die blocks by machining operations.

In order to inject the material for the locking insert, one of the plugs, as for example the plug 36, is advantageously bored to provide an injection channel 42 adapted to be engaged by a suitable injection nozzle (not illustrated) and connected with the insert cavity by the small injection orifice 46.

The close pressure contact of the threaded die blocks is sufficient to prevent appreciable flow of the material circumferentially away from the enlarged ends or heads 24 of the insert. As will be apparent to those skilled in the art, the dies 27, 28, and the cooperating nozzle are readily adapted to be mounted for use in injection molding machines of known kind in which multiple die assemblies may be used, so that a plurality of units may have insert material injected thereinto simultaneously by a single stroke or "shot" of the machine. Thus economy of production is readily attained.

While as will hereinafter appear the invention can be carried into effect with several specifically differing embodiments, the example just described embodies the basic features of advantage characteristic of the invention, among which the following are to be noted. The enlarged heads or ends of the insert provide locking faces having ample bearing area to ensure adequate locking, while at the same time the relatively very small diameter of the connecting bore 16 for the ligament portion 26 of the insert, which as illustrated is advantageously not more than half the diameter of the counterbores and preferably is materially less, results in negligible weakening of the shank because of removal of material required to provide the bore. By limiting the depth of the cylindrical counterbores to approximately the minor diameter of the thread, sockets are provided the major portions of the volumes of which are situated in the threaded zone of the shank defined between the minor and major diameters of the thread. Such sockets require the removal of the minimum of metal from the solid core portion of the shank, so that the provision of the sockets together with the small diameter connecting bore does not require removal of a total amount of solid metal sufficient to adversely affect the strength of the shank to an unacceptable extent. At the same time the enlarged head portions of the insert situated largely in the threaded zone of the shank contain a sufficient quantity of locking material to provide the required elastic locking action. The form of the insert inherently provides a positive lock against displacement of the insert from the shank and this is accomplished without the necessity for working the metal to form any kind of retaining abutment or the like. Also, the desired positive retention is accomplished without the necessity of resorting to any difficult or expensive undercutting or like operations for providing any reentrant form of cavity. All that is required is simple boring operations with conventional tools, it being characteristic that the cross sectional dimensions of the interior portions of the cavity do not exceed those of the opening or openings for the locking head portions of the insert. Locking material of the kind contemplated does not ordinarily bond itself to a metal surface and consequently plastic deformation and elastic memory of the entire body of the material in the cavity is usefully available for aiding the locking action.

Figure 7:
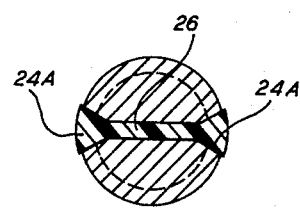
Fig. 7 is a section taken on the line 7—7 of Fig. 6.
Figure 6:
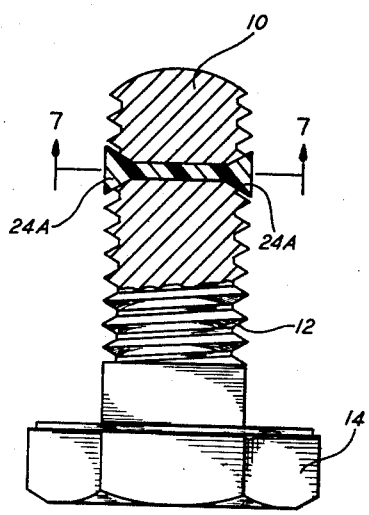
Fig. 6 is a fragmentary view similar to Fig. 1 showing another form of insert.

The exact configuration of the head portions is not critical and while for reasons previously noted the cylindrical counterbore form is advantageous, they may be made of other configuration, as for example conical, as shown at 24A in Figs. 6 and 7, the structure otherwise being as previously described. With this construction the head portions of the cavity are conveniently made with a standard countersink with a 90° included angle.

Figure 8:
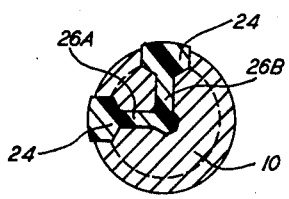
Fig. 8 is a section similar to Fig. 2 showing another embodiment of insert.

The form of cavity with a through bore terminating in diametrically opposed openings or mouths provides a locking insert which results in balanced radial forces or loading between the companion external and internal threads when parts including such an insert are assembled. In devices of the kind under consideration it has been proposed to make use of unbalanced radial forces generated by the locking insert, for which certain advantages are claimed as compared with structures producing balanced radial forces. The present invention is equally applicable to forms of insert giving either kind of loading and by way of illustration there is shown in Fig. 8 a section of another form of insert in which the head portions 24 are 90° apart rather than diametrically opposed, the connecting ligament being in two sections 26A and 26B at right angles to each other. It will be apparent that this form of insert also is inherently locked in the shank without recourse to undercutting or working the metal other than by conventional boring operations to form the cavity. Also, it will be apparent that the insert can readily be formed with apparatus and by operations such as previously described in connection with Figs. 3 and 4, employing quadrant dies similar to the jaws of a chuck rather than the semi-circular dies shown in the drawings. In connection with the form of insert shown in Fig. 8 it is to be noted that the counterbore for one of the heads 24 may be omitted if desired without affecting the inherent locking of the insert in position within the shank, which is accomplished by the angularly related sections 26A and 26B of the ligament.

While for purposes of illustration the insert 22 has been shown as placed near the end of the shank of a headed article, such as a machine screw or bolt, it may obviously be located at other places along the length of the threaded portion of the shank, for example near the head end of the thread in the case of a headed stud, as indicated in Fig. 1.

Figure 9:
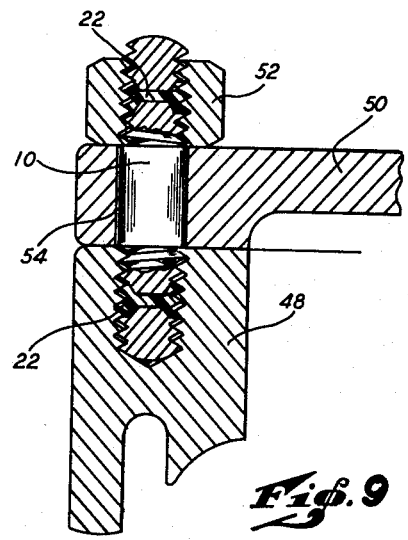
Fig. 9 is a fragmentary section showing the invention applied to a holddown stud.

The invention is also readily applicable to and highly useful with headless studs used in assemblies where locking action is desired between the stud and two or even more additional elements. In Fig. 9 there is illustrated by way of example a form of such stud suitable for use as a hold-down element for retaining the removable cylinder head of an internal combustion engine. In this figure the cylinder 48 has the stud 10 screwed into it and the cylinder head 50 is held down by the retaining nut 52 engaging the opposite end of the stud which projects through the bore 54 extending through the head. In this instance the stud is provided with inserts 22 near each of its threaded ends, one of which engages the block to prevent the stud from backing out under the influence of vibration, while the other engages the nut to provide a vibration-proof assembly without requiring other locking means such as a special lock nut, washer, cotter pin or the like.

From the foregoing it is apparent that the invention may be embodied in different forms and it is therefore understood as embracing all articles falling within the appended claims.

I claim:

1. A self-locking screw threaded fastening device comprising a body having an external thread and an insert receiving cavity in the threaded portion of the body, said cavity comprising two sockets having mouths opening through the threaded surface of the body at peripherally spaced places thereon and axially located so that at least one thread convolution is intersected by both mouths and an intermediate passage connecting said sockets, and a locking insert of thread impressionable elastic material filling said cavity and comprising head portions located in said sockets and a ligament portion in said intermediate passage connecting said head portions to retain the same in their respective sockets, each of said head portions extending outwardly beyond the minor diameter of said thread to present a locking surface positioned to have a thread impressed therein by a companion internal thread, the major portion of the volume of each socket and the head portion of the insert therein being situated in the threaded zone of the body defined between the minor and major diameters of the thread and the cross sectional area of said connecting passage and the ligament therein being a minor part of the area of either of said locking surfaces.

2. A device as defined in claim 1 in which said locking surfaces are convex.

3. A device as defined in claim 1 in which the bottom portions of the sockets are conical.

4. A device as defined in claim 1 in which the mouths of said sockets are diametrically opposed.

5. A device as defined in claim 1 in which each of said sockets comprises a cylindrical counterbore concentric with said intermediate passage and a conical bottom connecting the counterbore and the passage.

6. A device as defined in claim 5 in which the cylindrical counterbore portions of the sockets are substantially confined to the threaded zone of the body.

7. A device as defined in claim 5 in which the intermediate passage of the cavity is a cylindrical bore coaxial with the counterbores of the sockets and of not more than half the diameter of the counterbores.

SAMUEL W. CHANTLER.

References Cited in the file of this patent

UNITED STATES PATENTS

| Number | Name | Date |
|---|---|---|
| 2,568,274 | Clark | Sept. 18, 1951 |

FOREIGN PATENTS

| Number | Country | Date |
|---|---|---|
| 496,638 | Great Britain | Dec. 2, 1938 |
| 964,862 | France | Aug. 28, 1950 |